United States Patent
Wilhelmsen et al.

(10) Patent No.: US 12,129,110 B2
(45) Date of Patent: Oct. 29, 2024

(54) DEVICE, SYSTEM AND METHOD FOR COMPRESSING WASTE

(71) Applicant: Compax Solutions AS, Lysaker (NO)

(72) Inventors: Christian Wilhelmsen, Stabekk (NO); Anders Engebakken, Ski (NO)

(73) Assignee: Compax Solutions AS, Lysaker (NO)

(*) Notice: Subject to any disclaimer, the term of this patent is extended or adjusted under 35 U.S.C. 154(b) by 464 days.

(21) Appl. No.: 17/432,024

(22) PCT Filed: Mar. 6, 2020

(86) PCT No.: PCT/NO2020/050061
§ 371 (c)(1),
(2) Date: Aug. 18, 2021

(87) PCT Pub. No.: WO2020/180196
PCT Pub. Date: Sep. 10, 2020

(65) Prior Publication Data
US 2022/0153517 A1    May 19, 2022

(30) Foreign Application Priority Data

Mar. 6, 2019 (NO) .................................. 20190308

(51) Int. Cl.
*B65F 1/14* (2006.01)
*B01D 46/00* (2022.01)
(Continued)

(52) U.S. Cl.
CPC ........ *B65F 1/1405* (2013.01); *B01D 46/0028* (2013.01); *B01D 46/0038* (2013.01);
(Continued)

(58) Field of Classification Search
CPC ....... B30B 5/02; B30B 9/3017; B30B 9/3046; B65F 1/1405; B65F 1/06; B65F 1/1415;
(Continued)

(56) References Cited

U.S. PATENT DOCUMENTS 4,748,905 A * 6/1988 Langdon ................... B65F 1/06
53/107
5,255,982 A * 10/1993 Zimmer ................ B30B 9/3075
383/33
(Continued)

FOREIGN PATENT DOCUMENTS

CN   204822825   12/2015
CN   106429102    2/2017
(Continued)

OTHER PUBLICATIONS

Norwegian Search Report for NO 20190308, dated Jul. 3, 2019.
(Continued)

*Primary Examiner* — Jimmy T Nguyen
(74) *Attorney, Agent, or Firm* — Andrus Intellectual Property Law, LLP

(57) ABSTRACT

A device is for compressing waste. The device includes: a waste bag suspension member formed with an upper portion around which an opening of a flexible waste bag may be spanned; a lid movable between an open position, wherein waste may be added to a waste bag through the upper portion of the waste bag suspension member, and a closed position, wherein the lid covers the upper portion of the waste bag suspension member so that an at least partially closed volume may be formed between the lid and the waste bag; and a suction member adapted to evacuate air from the at least partially closed volume. The lid is perforated so that the suction device may evacuate the air through the perforation(s) in the lid. There is also disclosed a system for compressing waste as well as a method for operating the system.

15 Claims, 8 Drawing Sheets

(51) Int. Cl.
    *B01D 53/26*        (2006.01)
    *B30B 5/02*         (2006.01)
    *B65F 1/06*         (2006.01)
    *B65F 1/16*         (2006.01)

(52) U.S. Cl.
    CPC ......... *B01D 46/0049* (2013.01); *B01D 53/26* (2013.01); *B30B 5/02* (2013.01); *B65F 1/06* (2013.01); *B65F 1/1415* (2013.01); *B65F 1/1426* (2013.01); *B65F 1/1607* (2013.01); *B01D 2279/65* (2013.01); *B65F 2210/144* (2013.01); *B65F 2210/168* (2013.01); *B65F 2210/179* (2013.01); *B65F 2210/188* (2013.01); *B65F 2210/20* (2013.01)

(58) Field of Classification Search
    CPC .................. B65F 1/1426; B65F 1/1607; B65F 2210/144; B65F 2210/168; B65F 2210/179; B65F 2210/188; B65F 2210/20; B65F 1/068; B65F 1/14; B01D 46/0028; B01D 46/0038; B01D 46/0049; B01D 53/26; B01D 2279/65
    See application file for complete search history.

(56) References Cited

U.S. PATENT DOCUMENTS

| | | | |
|---|---|---|---|
| 7,322,286 B2 | 1/2008 | Labeille et al. | |
| 2003/0136279 A1 | 7/2003 | Tarlow | |
| 2011/0100997 A1* | 5/2011 | Gagnebin | B65F 1/06 220/495.04 |
| 2015/0343732 A1* | 12/2015 | Schliwa | B30B 5/02 100/229 A |
| 2018/0134391 A1* | 5/2018 | Spille | B64D 11/02 |
| 2019/0061297 A1* | 2/2019 | Lutzer | B30B 9/225 |

FOREIGN PATENT DOCUMENTS

| | | | | |
|---|---|---|---|---|
| CN | 209922939 U | * | 1/2020 | ................ C02F 1/20 |
| CN | 112644064 A | * | 4/2021 | ........... B30B 11/022 |
| CN | 217577712 U | * | 10/2022 | .............. F04C 25/02 |
| GB | 2433871 | | 7/2007 | |
| JP | 2002255304 | | 9/2002 | |
| WO | WO-2006120718 A1 | * | 11/2006 | ........... B30B 9/3017 |
| WO | 2007048925 | | 5/2007 | |
| WO | 2016189143 | | 12/2016 | |

OTHER PUBLICATIONS

International Search Report and the Written Opinion or PCT/NO2020/050061, dated May 20, 2020.

Supplementary European Search Report issued in European Application No. 20766020, dated Oct. 3, 2022.

\* cited by examiner

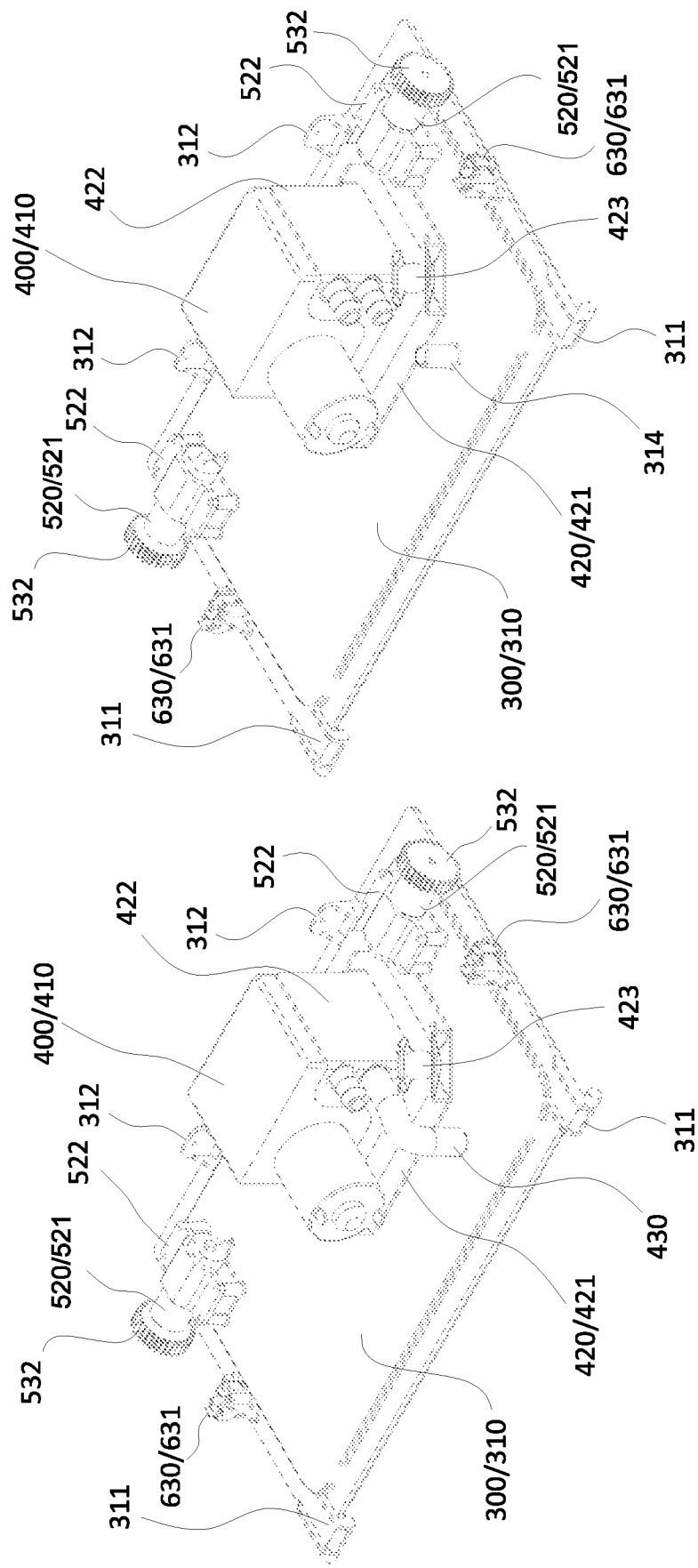

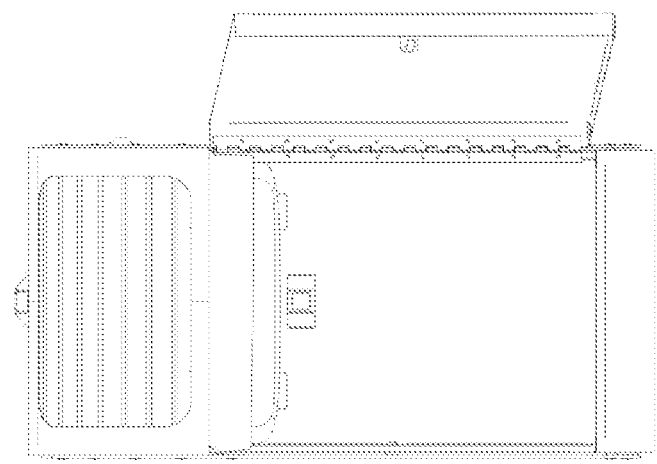
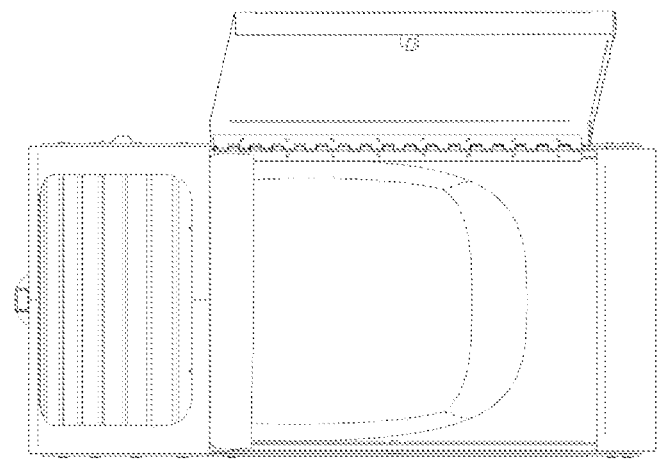
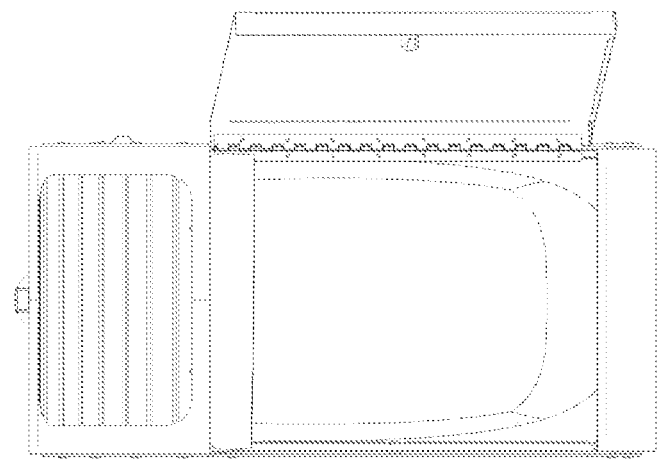
Figure 12

DEVICE, SYSTEM AND METHOD FOR COMPRESSING WASTE

CROSS-REFERENCE TO RELATED APPLICATIONS

This application is the U.S. national stage application of International Application PCT/NO2020/050061, filed Mar. 6, 2020, which international application was published on Sep. 10, 2020, as International Publication WO 2020/180196 in the English language. The International Application claims priority of Norwegian Patent Application No. 20190308, filed Mar. 6, 2019. The international application and Norwegian application are both incorporated herein by reference, in entirety.

FIELD

The present invention relates to a device for compressing waste. More particularly, the invention relates to a device for compressing waste, the device comprising a waste bag suspension member formed with an upper portion around which an opening of a flexible waste bag may be spanned, a lid movable between an open position, wherein waste may be added to a waste bag through the upper portion of the waste bag suspension member, and a closed position, wherein the lid covers the upper portion of the waste bag suspension member so that an at least partially closed volume may be formed between the lid and the waste bag, and a suction member adapted to evacuate air from the at least partially closed volume. The invention also relates to a system for compressing waste as well as a method for operating the system.

BACKGROUND

Waste management and handling in public areas, commercial premises and industrial facilities involve several challenges linked to e.g. hygiene, working routines, logistics and environmental aspects. These challenges are directly connected to unnecessarily high expenses due to great volumes, frequent disposal and supervision of low volume waste enclosures and substantial amounts of consumables, causing large labouring costs, high volume procurements, complex logistics and inefficient workflow.

The main root of the preceding challenges is the high waste volumes accumulating at the earlier mentioned locations. This accumulation is partly due to several types of waste with different shapes, sizes, and volumes such as paper cups, bottles, plastic wrapping, paper towels, etc. which are tossed into the same waste enclosure, having a limited internal volume. A consequence is a confined volume potential within the waste enclosure, meaning that there is a considerable amount of available volume not being fully utilised for accommodating waste. In many cases, this may cause waste overflow which is a common problem giving rise to poor levels of cleanliness and hygiene, among others. Another issue with such great waste volumes is the substantial amount of air within the disposed waste bags.

One known prior art document JP 2002255304 A discloses a waste container incorporating a compacting device meant for paper waste. A bag is suspended by waste bag holders. Air extraction openings are arranged on one side of the container.

SUMMARY

The invention has for its object to remedy or to reduce at least one of the drawbacks of the prior art, or at least provide a useful alternative to prior art.

The object is achieved through features, which are specified in the description below and in the claims that follow.

In a first aspect, the invention relates to a device for compressing waste, said device including:
- a waste bag suspension member formed with an upper portion around which an opening of a flexible waste bag may be spanned;
- a lid movable between an open position, wherein waste may be added to a waste bag through the upper portion of the waste bag suspension member, and a closed position, wherein the lid covers the upper portion of the waste bag suspension member so that an at least partially closed volume may be formed between the lid and the waste bag; and
- a suction member adapted to evacuate air from the at least partially closed volume, wherein the lid is perforated so that the suction device may evacuate the air through the perforation(s) in the lid.

In one embodiment the lid may be rotatable between the open and the closed position, which provides for easy and reliable opening and closing.

In one embodiment, the suction device may be connected to the lid, which may provide for a particularly compact solution. Further, the suction device may be connected to the lid via vibration damping means, for reducing mechanical vibrations to the device from the suction device, which may be a pump.

In one embodiment, the device may be provided with a means for reducing noise from the suction device, such as a muffler provided at an outlet of the suction device.

In one embodiment, the device may further include an air filter provided upstream of an inlet and/or of an outlet of the suction device for preventing fine particles and/or odour and/or bacteria and/or noxious gasses from reaching the suction device and/or to be pumped out of the suction member.

In one embodiment, the device may further include a gas-liquid separation device, i.e. separating potential water/moist from the air flow, provided upstream of an inlet of the suction member, in order to prevent water/moist from reaching the suction device so as to potentially prolong the lifetime of the suction member.

In one embodiment, the waste bag suspension member may further include a lower portion adapted to at least partially cover the sides of a waste bag suspended in the waste bag suspension member, whereby the waste bag may be at least partially protected by the suspension member and damage, such as ruptures, to the waste bag may be prevented.

In one embodiment the device may further comprise a raising/lowering mechanism adapted to lift the waste bag during evacuation and to subsequently lower the waste bag, which may be advantageous for compression in the vertical direction of the waste bag. This effect may be particularly pronounced in an embodiment where the waste bag is larger/longer in the vertical direction than in the transverse/horizontal directions, where the waste bag, without the raising mechanism, would become more compressed in the transverse directions. The raising lower mechanism could be implemented by means of an inflatable bladder being provided under the waste bag, as will be described in more detail below. Alternatively, the waste bag may be raised and lowered by means of other electromechanical, pneumatic or hydraulic lifting mechanisms synchronised with the evacuation cycles of the device.

In a second aspect, the invention relates to a system for compressing waste, the system including:

a device according to the first aspect of the invention;
a flexible waste bag spanned over the upper portion of the waste bag suspension member; and
a housing at least partially covering the lid, the waste bag suspension member and the waste bag, wherein the flexible waste bag, upon evacuation, is retracted to compress waste present therein.

In one embodiment, the waste bag suspension member may be tiltable from a first position, wherein the upper portion is substantially horizontal, to a second position, wherein the upper portion is at least partially vertical, whereby removal of the waste bag may be substantially simplified.

The system may be provided with a control unit adapted to regulate compression cycles of the system as will be disclosed in the following.

In one embodiment, the system may function as a sensor hub and be provided with one or more sensors and/or means for sensing/monitoring and/or acquire data/information about one or more of the following parameters;
  personnel proximity to the system;
  fullness of the waste bag;
  current consumption of suction device;
  current consumption of motor for moving lid;
  position of lid;
  pressure in isolated volume between waste bag and closed lid, and wherein the control unit is adapted to regulate compression cycles at least partially based on one or more of the following parameters:
  indoor climate, including temperature, $CO_2$ level, humidity, total volatile organic compounds (TVOC), pathogen level, ambient pressure, radon level, etc.;
  local temperature within and outside the embodiment, especially considering fire hazards; and
  level of remaining consumables in different dispensers of paper towels, toilet paper, soap, sanitary bands and bags, etc.

In a third aspect, the invention relates to a method for compressing waste by means of a system according to the second aspect of the invention; the method including the steps of:
  spanning a flexible waste bag around the upper portion of the waste bag suspension member;
  close the lid;
  start suction member to at least partly evacuate the isolated volume between the closed lid and the waste bag in order compress waste present in the waste bag by retraction of the waste bag; and
  remove waste bag with compressed waste.

In one embodiment, the method may, prior to the step of removing the waste bag include the following steps:
  open lid to allow more waste to be added to the waste bag after waste has been compressed,
  close lid again;
  restart suction member to evacuate the isolated volume between the closed lid and the waste bag to further compress waste present in the same waste bag by retraction of the waste bag.

The system according to the second aspect of the invention, will in the following be described as a vacuum based "smart waste compactor" (SWC). All its relevant parts will, in the further writing, be referred to the attached drawings.

Further preferable features and advantageous details of the present invention will appear from the following example description, claims and attached drawings.

BRIEF DESCRIPTION OF THE DRAWINGS

The present invention will be described and exemplified in further detail below, with references to the attached drawings where:

FIG. 9 is a principle drawing of the RL assembly (300) of a vacuum based SWC (100) according to an embodiment of the present solution.

FIG. 10 is a principle drawing of the RL assembly (300) of a vacuum based SWC (100) according to an embodiment of the present solution with the tube/hose (430) removed.

FIG. 12 is a principle drawing of the three steps, i, ii and iii, constituting one compression cycle of a vacuum based SWC (100) according to an embodiment of the present solution. Configuration i illustrates a state just before initiation of the compression cycle. Configuration ii illustrates a state where the waste bag (700) is halfway retracted. Configuration iii illustrates a state where the waste bag (700)

Figure 2:
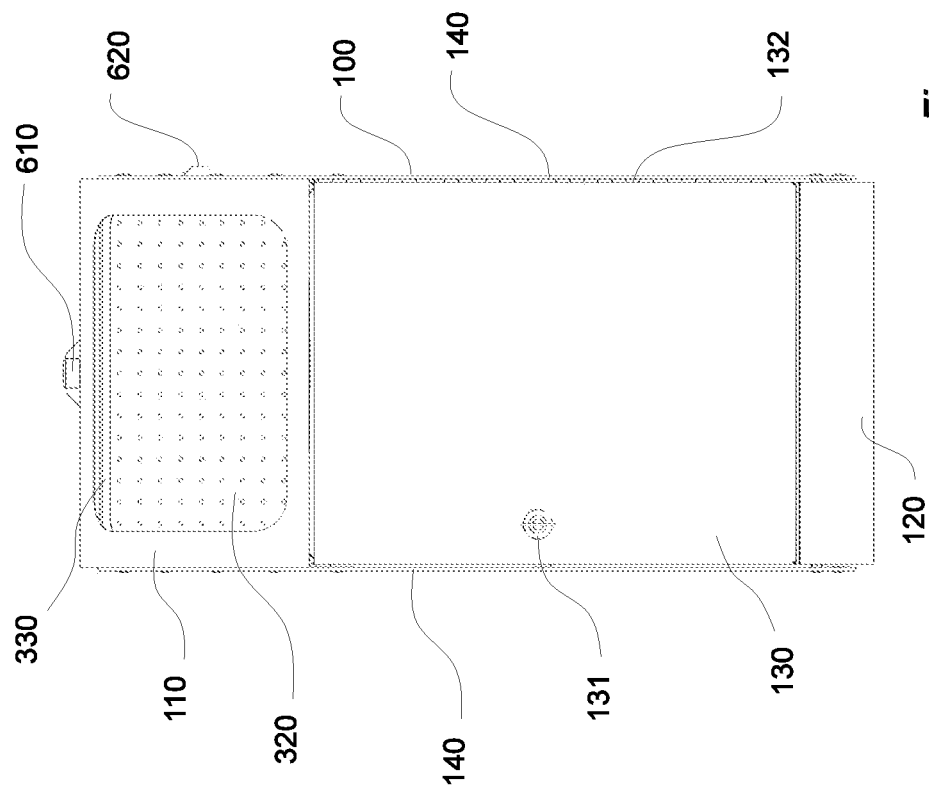
FIG. 2 is a principle drawing of a vacuum based SWC (100) according to an embodiment of the present solution seen from the front with the rotary lid (RL) assembly (300) in the open configuration.
Figure 1:
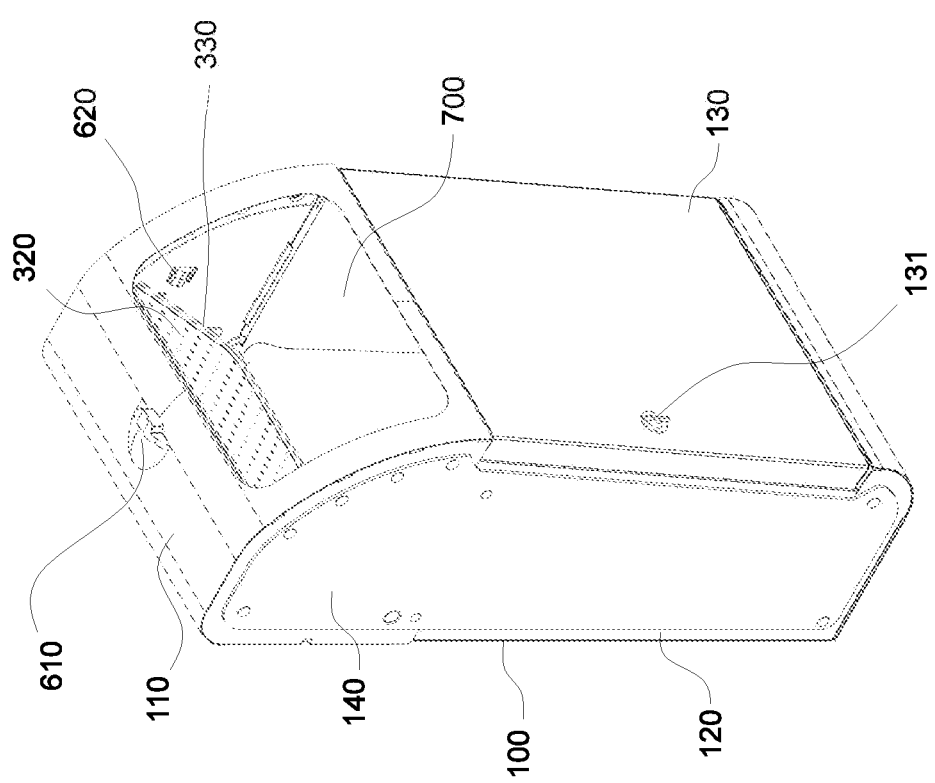
FIG. 1 is a principle drawing of a vacuum based SWC (100) according to an embodiment of the present solution with a waste bag (700) arranged.

is fully retracted, and the waste therein is inflicted with pressure and undergoes compression.

DETAILED DESCRIPTION OF THE DRAWINGS

Vacuum Based Smart Waste Compactor (100):

Reference is now made to all figures, i.e. FIG. 1 through FIG. 12, where an embodiment of a vacuum based SWC (100) according the present invention is shown. The SWC (100) is formed by a container assembly including an upper (110) and a lower part (120), a WBSM assembly (200), an RL assembly (300), a suction device (SD) assembly (400), a control unit (500), a sensor system (610, 620, 630, 640, 650), a bag (700) holding e.g. waste or other suitable content and all relevant components, parts and/or sub-assemblies.

Upper Part of the Container Assembly (110):

In this particular example, especially referring to FIG. 1 through FIG. 6 in addition to FIG. 12, the UPCA (110) is formed like a rectangular cupola/dome and is slightly wider and deeper than the LPCA (120) such that it can slip/glide over the edge and cover the top of the LPCA (120). However, it is obvious for a skilled person that other shapes like a rectangular or square box, a circular, elliptic, hexagonal or octagonal cupola/dome, or similar of the UPCA (110) can be utilised and that the proportional arrangement can be done the other way around, with the LPCA (120) covering the bottom of the UPCA (110). In this example, the UPCA (110) is further arranged with two small flanges protruding inwards at the lower edges on the sidewalls of the UPCA (110) in a way so as to let it rest on top of the upper edge of the LPCA (120) when assembled. The UPCA (110) can also exhibit other means allowing it to rest on the side, front and/or backwalls of the LPCA (120) by use of protruding flanges, z-bend(s) in the walls of the UPCA (110) or the LPCA (120), protruding pins/plugs, adhesives, magnets or similar which will be in the knowledge of a skilled person.

The UPCA (110) is arranged so as to employ a fastening mechanism in order to attach it to the LPCA (120). It must nevertheless be emphasised that this fastening mechanism enable the possibility of disassembly/separation of the UPCA (110) from the LPCA (120). According to the present invention, the UPCA (110) is further arranged to partly or entirely comprise the employed electronics and the essential technology for the SWC (100) to function. This arrangement is preferable to retain the opportunity of simple service, maintenance and replacement of any malfunctioning or worn parts. It is further evident that the example illustrates a rectangular opening for reception of waste in the front wall of the UPCA (110). This hole/opening can be arranged in other locations of the container assembly, e.g. in the sidewall, at the top or even in the LPCA (120) without considerable inventive effort. The shape of said hole/opening can of course exhibit other shapes, such as square, circular, elliptic, hexagonal, octagonal or the like. It will further be obvious for a skilled person that a service hatch allowing for ameliorated access during service operations could be arranged on e.g. the back or side wall(s) of the UPCA (110).

Lower Part of the Container Assembly (120):

According to the presented example, referring to FIG. 1 through FIG. 7 in addition to FIG. 12, the LPCA (120) is arranged so as to accommodate the form and size of the UPCA (110) in the top section, and vice versa. Furthermore, the attachment means employed for connection of the UPCA (110) and the LPCA (120) is through plugs transpiercing both the UPCA (110) and the LPCA (120). It is, however, obvious that other means like e.g. pins, bolts/screws, eccentric locks, snap-locks, hooks, adhesives, magnets or similar is within the knowledge of a skilled person. The LPCA (120) is, according to the present invention, an open container (i.e. no upper part/lid) accommodating both the WBSM assembly (200) and the waste bag (700) with appurtenant content/waste. The shape/design of the LPCA (120) is further formed like a rounded rectangular box with an inclined front wall for aesthetic and spatial purposes, i.e. to appear attractive and to better fit in cramped places. Nevertheless, it is within a skilled persons knowledge that other designs/shapes and cross-sections like square, circular, elliptical, hexagonal, octagonal, or the like, with or without inclined walls, can be used without notable confinement of the waste compaction.

According to the given example the LPCA (120) is further equipped with a hinged door (130), rotatable about a hinge (132), which can be opened and closed by use of a cabinet lock (131) with a turn switch, push-release/push-restraint, or the like. This door has a mainly U-shaped cross-section facing inwards against the LPCA (120) and the bag (700) suspended therein, but it is obvious that other cross-sectional shapes can be utilised serving the same purpose. It is also possible to hinge the door on the other sidewall, at the top or at the bottom mainly providing the same purpose. Furthermore, it is possible to use a simple plate detachable from the LPCA (120), i.e. fully removable, some kind of a drawer mechanism allowing the door/cover to be pulled out when needed or similar solutions within the knowledge of a skilled person.

The LPCA (120) can also function without any door/cover (i.e. with a hole in the front wall) or without any holes to cover at all. The LPCA (120) concurring with the given example encompasses the WBSM assembly (200) and the waste bag (700) including waste. The LPCA (120) is further, according to the given example, provided with holes in the backplate, intended for optional wall mounting. These holes are further arranged so as to enable wall mounting by use of a suspension bracket (150) attached to the wall with screws and wall anchors, and further attachment through screws and wall anchors in order to fasten the SWC (100) to the wall as well. Other methods known to a skilled person can obviously be employed, like e.g. different types of adhesive, nailing, attachment lugs, hooks, magnets or the like.

According to the present example, aesthetic cover plates (140) are mounted on the outside of the side walls of the container assembly (110, 120). By concealing miscellaneous fasteners/attachments, these aesthetic cover plates (140) provide a pleasing expression of the SWC (100). The aesthetic cover plates (140) may also function as a measure used to assemble/mount the UPCA (110) and LPCA (120). It is obvious that such aesthetic cover plates (140) can have other shapes and/or arrangements which is expected to be within the knowledge of a skilled person.

Figure 4:
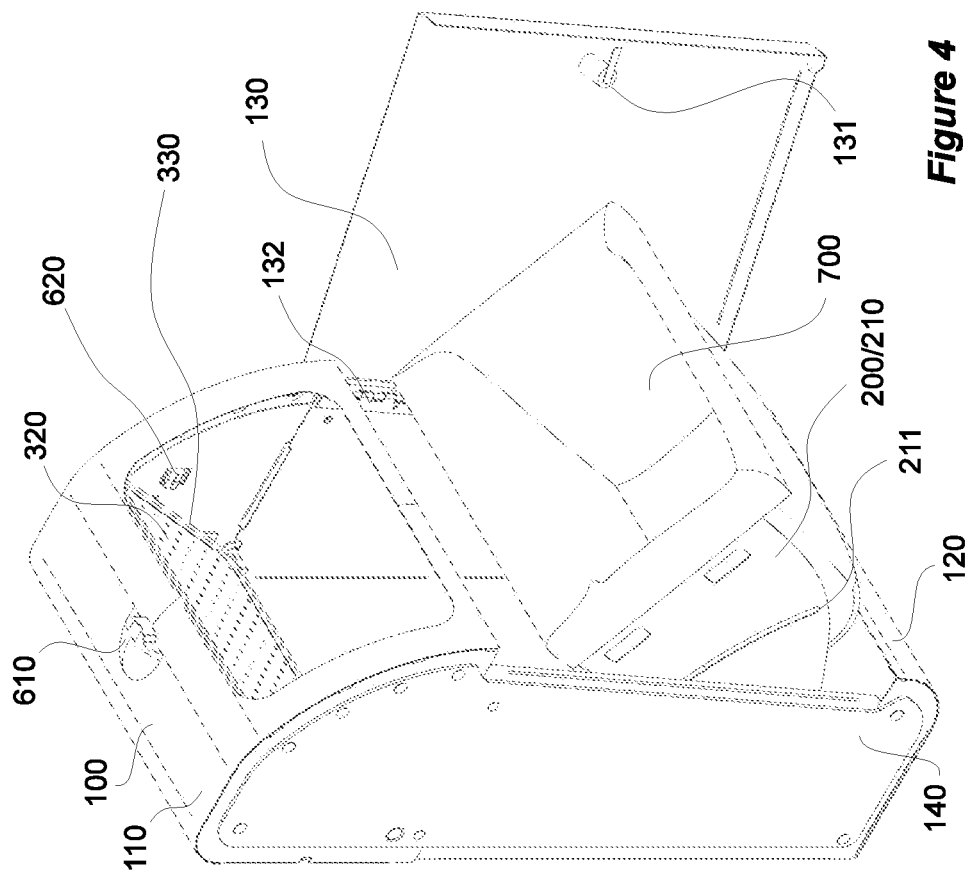
FIG. 4 is a principle drawing of a vacuum based SWC (100) according to an embodiment of the present solution with the front door (130) in open configuration, the WBSM assembly (200) in the outward tilted position providing easy access of the arranged waste bag (700).
Figure 3:
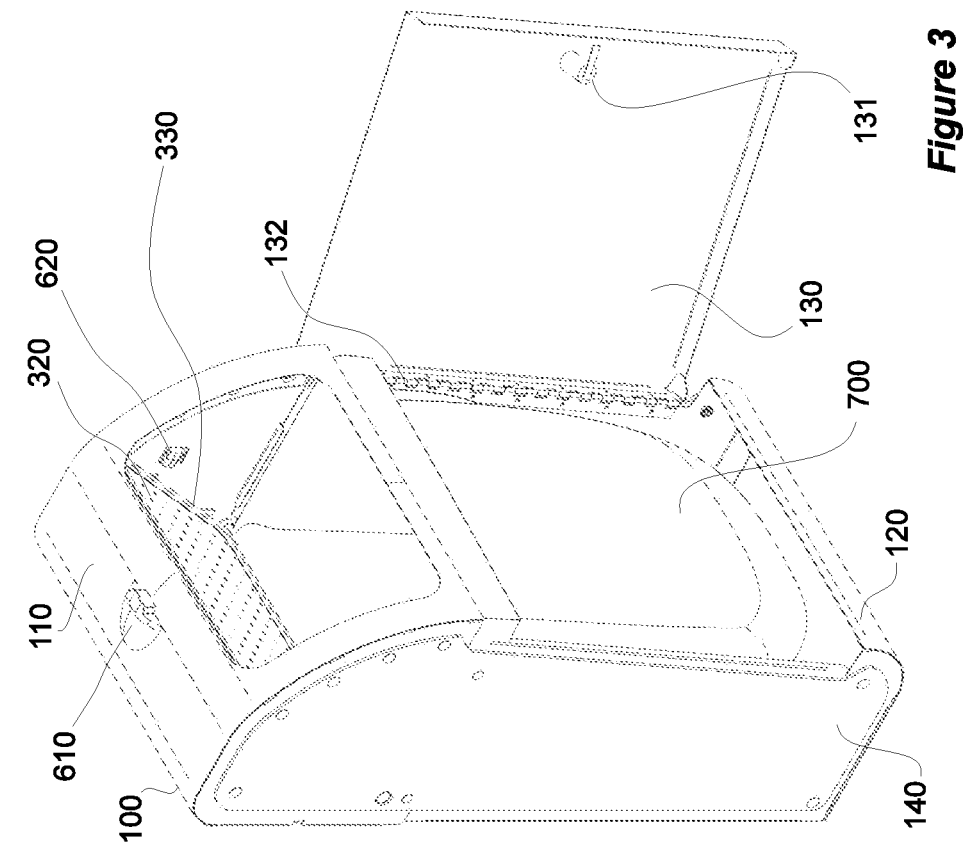
FIG. 3 is a principle drawing of a vacuum based SWC (100) according to an embodiment of the present solution with the front door (130) in open configuration, the waste bag (700) arranged and the waste bag suspension member (WBSM) assembly (200) in the upright, receptive position.
Figure 6:
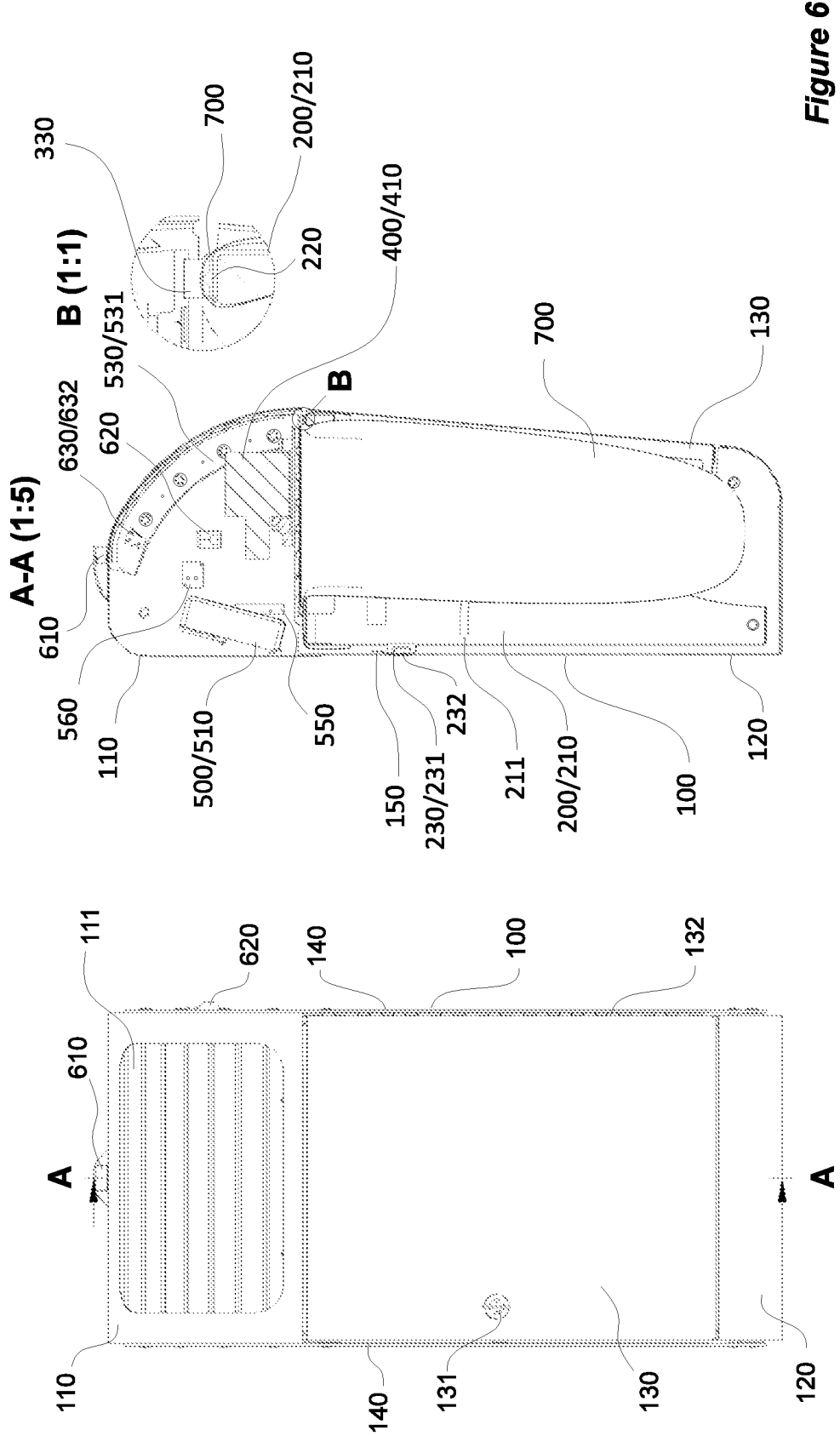
FIG. 6 is a principle drawing of a left side section view of a vacuum based SWC (100) according to an embodiment of the present solution with the RL assembly (300) in the closed configuration and a waste bag (700) arranged. A closer view of the hermitizing components are also given, i.e. the rigid frame (220) and the flexible gasket frame (FGF) (330).
Figure 8:
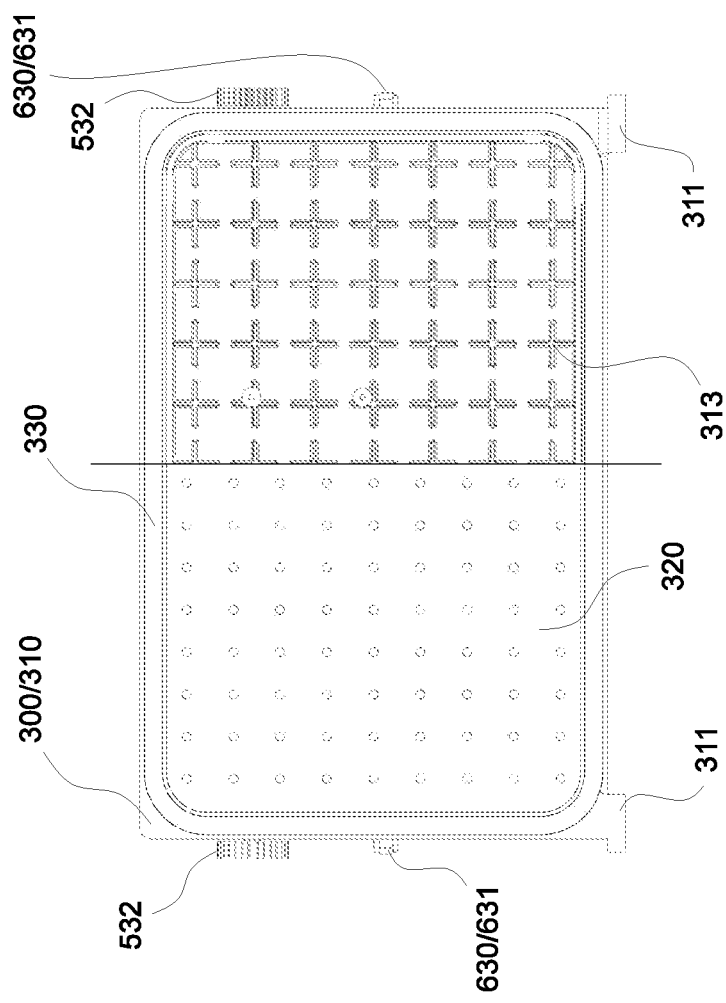
FIG. 8 is a combination of two principle drawings of the RL assembly (300) of a vacuum based SWC (100) according to an embodiment of the present solution seen from below and separated by a centreline marking the border between the two combined drawings. The drawing on the lefthand side have the perforated plate (320) included, while the perforated plate (320) is removed from the drawing on the right-hand side thereby displaying the otherwise concealed reinforcing structure (313).
Figure 7:
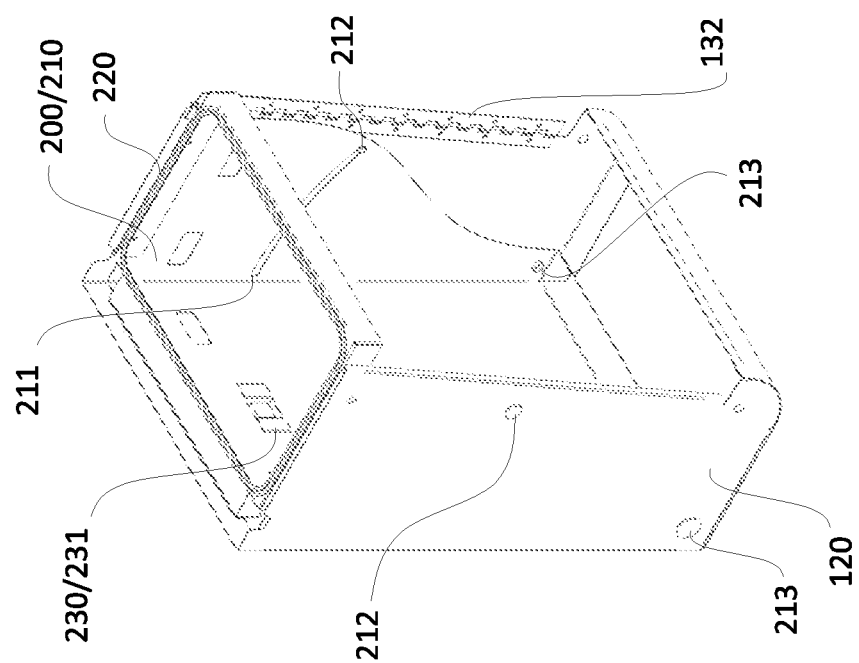
FIG. 7 is a principle drawing of the lower part of the container assembly (LPCA) (120) of a vacuum based SWC (100) according to an embodiment of the present solution, with the front door (130) removed and without a waste bag (700) arranged.

Waste Bag Suspension Member Assembly (200):

Reference is now further made to FIG. 4, FIG. 6 and FIG. 7, demonstrating one embodiment of the WBSM assembly (200) and some of its key functions. The WBSM assembly (200) according to the present invention may be formed by a frame for suspending a waste bag (700) and is constituted by an upper section with a cross-sectional L-shape facing inwards towards the waste bag (700) and the bottom section of the LPCA (120). The top of this upper section of the WBSM (210) is consisted of four adjoining rounded rectangular flanges with a central mainly rectangularly shaped hole and a flat surface area large enough to support/attach the rigid frame (220) for which the waste bag (700) is pulled over and suspended to. The lower section of the WBSM (210) is comprised by a straight backwall and two sidewalls decreasing in depth from top to bottom. These walls prevent the waste bag (700) to tear, rip, puncture, or the like when in use and during emptying/replacement of the waste bag (700). The two sections of the WBSM (210) can be composed of a single part but can just as well be split into two parts later connected by e.g. screws, plugs, adhesives, rivets/spikes, spot welding or other methods known by a skilled person.

The waste bag (700) is suspended to the WBSM assembly (200) by being drawn through the middle mainly rectangularly shaped hole of the top section and over the adjoining narrow flanges. In order to ensure that the waste bag (700) is suspended even when its content becomes heavy, an elastic band/cord encircling the perimeter of the WBSM (210) fitted on the outside of the waste bag (700) providing a pressure/force strong enough to keep the waste bag (700) in place is used. It is also possible to use a fastening bracket/hook attached on the outer sidewall(s) of the WBSM (210) preventing it from being drawn off. Other methods evident within the knowledge of a skilled person can be employed ensuring reliable suspension of the waste bag (700) as well, such as Velcro straps, magnetic locking, stuffing the top portion of the waste bag (700) into a narrow crevice between two rubber mats (or similar) relying on friction, etc.

A waste bag (700) is mainly employed in that it serves practical for storage, compression and hygienic purposes. The waste bag (700) is, according to the present example, formed from a thin, flexible and recyclable plastic film, but it is obvious that other materials and different forms/shapes can be used, like e.g. nonwoven fabric, paper, plastic textile, starch, bioplastics, biodegradable plastics, or similar, preferably recyclable, all of which within the knowledge of a skilled person and which allows the waste bag to be compressed. The form/shape of the waste bag (700) should be wide enough for easy suspension, but not too wide such that folds over the suspending flange at the top section of the WBSM assembly (200) may prevent proper hermitization. Furthermore, the waste bag (700) should be long enough to rest at the bottom of the LPCA (120), but not longer than necessary such that more material and thereby extra cost and emissions are expended. However, the waste bag (700), according to the present example, should neither be too short, as the weight of the content may contribute to excessive straining of the material, thus, potentially causing e.g. puncturing/bursting of the waste bag (700) if fully suspended. Too small waste bags (700), i.e. partly or fully suspended, may also cause poorer/inadequate release of space/volume therein. The material comprising the waste bag (700) is preferably strong enough to avoid or at least withstand creep/fatigue over time and/or multiple compression cycles.

The WBSM assembly (200) is further arranged in such a way that it is pivotable/tiltable about its lower rear end between an open and closed position. It should be noted that in alternative embodiments, the WBSM assembly (200) may be tiltable at other heights and/or depths, such as around a middle portion. This feature is included in order to enable a rotary motion forward during emptying and waste bag (700) replacement when the front wall of the LPCA (120) is not hindering the motion, i.e. when in open configuration. In closed configuration, the upper face of the WBSM assembly (200) is parallel to the upper and lower faces and perpendicular to the faces of the sidewalls of the container assembly (110, 120). In open configuration said upper face of the WBSM assembly (200) creates an angle between 90° and 0° depending on the rotation of the device. The WBSM assembly (200) is further equipped with a shaft/plugs (213) supported at the inner wall at the bottom section of the LPCA (120) which pierces through the wall, enabling pivoting of the WBSM assembly (200). As the shaft/plugs (213) pierces through the WBSM (210) as well, there are corresponding holes in the sidewalls of the WBSM (210). It is also possible to exploit bearings so as to provide less friction in the rotational motion of the WBSM assembly (200). Another solution is e.g. the use of a hinge attached to the backwall of the LPCA (120) and the bottom section of the WBSM (210).

In order to prevent unintended pivoting of the WBSM assembly (200) during regular use, an arrangement for intermediate/semi-permanent attachment is provided. This arrangement is, according to the example, solved by use of a magnetic snap-lock assembly (230), constituted by a magnet holder (231) and a magnet (232), employing a magnetic (induced) forcefield to attract the backwall of the WBSM (210) and the backwall of the LPCA (120). However, this function can also be solved by other types of mechanical snap-locks using e.g. pins/plugs/studs/etc. protruding from the WBSM (210) and snapping into a locking fixture mounted on the internal sidewall(s) of the LPCA (120), or vice versa. Obviously, there are other methods not including snap-locks as well, which should be known to a skilled person.

To prevent the WBSM assembly (200) from pivoting too far, its sidewalls are provided with cam slots/railings/tracks (211) corresponding to the curved path of the pivoting motion. Studs/plugs/pins/etc. (212) are further protruding internally from the sidewalls of the lower part of the container assembly (120) and through these slots in order to guide the pivoting motion of the WBSM assembly (200) and to retain it at its predetermined extremal configurations, i.e. at the position furthest out and the position associated with normal operation. The WBSM assembly (200) can alternatively be retained by use of an elastic band/cord, wire, telescopic rod, scissor mechanism, bellows/concertina fold, or other fixtures/arrangements known by a skilled person, preventing the WBSM assembly (200) from pivoting further than a given angle. It is also possible to use a fixture/arrangement that stops at a given user-defined angle due to gradual/stepwise pivoting or due to intended friction in the system making the fixture/arrangement able to withstand the weight of the WBSM assembly (200) and content of the waste bag (700) combined.

According to the present example, at least one rigid frame (220) with mainly triangularly shaped cross-section, continuous part or connected/adjoining strips/cords/lists, are fastened on the flat surface of the upper flange of the WBSM (210) or incorporated/embedded in a groove thereon. This enables higher pressure between the waste bag (700) and the FGF (330) making it more likely to attain hermitization of the system. However, the rigid frame (220) can be mounted at the underside of the RL assembly (300) instead, or not be implemented at all. The rigid frame (220) has a triangularly shaped cross-section, thus corresponding to a pointy tip. Other cross-sectional shapes are nonetheless possible to employ, such like a cross-section having one or more somewhat rounded tops/peaks. By using cross-sections with pointy tips, the pressure between the waste bag (700) and the FGF (330) will increase compared to that of e.g. a flat contact face. This increase in pressure occurs since the area of contact is much smaller than if they were flat. In addition to increased pressure, several suchlike pointy tips may contribute to improved mechanical locking/sealing of the waste bag (700) due to the geometrical shape inducing a longer path for the intruding air to flow through. However, more tops/peaks increase the area of contact and thus decrease the contact pressure.

Rotary Lid Assembly (300):

Reference is now particularly made to FIG. 5, FIG. 6 and FIG. 8 through FIG. 10. According to the present invention, the RL assembly (300) is supported at the rear end within the UPCA (110) in order to enable an angular/pivoting motion of the RL assembly (300). In the course of normal operation, i.e. reception of waste, closing the access of the consecutive waste flow, compression of the waste therein and reopening of said access, the top face of the RL (310) makes an angle of 0°-90° with the back wall of the UPCA (110) and LPCA (120) depending on the configuration during reception of waste, the configuration during a compression cycle and the momentary configurations between the two. The RL assembly (300) is formed as a flat, rounded and hollow rectangular box with perforations in the bottom surface (320) facing downwards into the waste bag (700). This lower surface of the RL assembly (300) is a rounded rectangular perforated plate (320) exploited for distribution of the airflow during evacuation of the waste bag (700). The perforation further ensures that the largest content debris/particles from the waste bag (700) is not drawn into the SD (410) and prevent clogging/jamming of the system. The perforated holes must be small enough not to puncture the waste bag (700) due to pulling/stretching of the bag (700) material over the perforated area and large enough to maintain reasonable air flow. Obviously, there are other shapes and arrangements, like square, circular, elliptic, hexahedron, octahedron, or similar, known to a skilled person that can be used. Note that other arrangements like e.g. porous materials or flexible nettings/meshes may serve the same function as the said perforated plate (320).

The RL (310) has a U-shaped cross-section facing downwards towards the perforated plate (320). In combination with the flat perforated plate (320) it makes a hollow structure allowing air to flow through into a rigid/flexible not collapsible tube/hose (430) and through the SD (410). It is assumed that a skilled person will possess knowledge of alternative shapes and arrangements of the RL assembly (300), as stated above, and different types of both rigid and flexible tubes/hoses (430) suitable for guiding the airflow into the SD (410) without collapsing.

According to the present example, a reinforcing structure (313) is implemented inside the hollow RL assembly (300) in order to prevent collapse/buckling during evacuation and the loading consequently inflicted by the pressure difference (partly vacuum) between the inside and outside of the waste bag (700). The reinforcing structure (313) is configured in a way so as to allow the airflow to pass through without reducing the flux area. It is obvious for a skilled person that there exist alternative methods to prevent collapse/buckling of the cavity inside the RL assembly (300), two of which are e.g. greater wall thickness and reinforcements on the outside of the cavity. The RL assembly (300) can be arranged as one inseparable part or as two, three or more separate parts, i.e. the perforated plate (320), the RL (310) and the reinforcing structure (313) may be configured based on e.g. the most appropriate manufacturing method.

One advantage of the configuration of the RL assembly (300) is the low possibility of moisture and/or liquids (i.e. water, coffee, soft drinks, etc.) entering the SD (410). Since the SWC (100) only runs for a short period of time during each compression cycle, it is difficult for the moisture/liquids to even get sucked out of the waste bag (700). Nevertheless, if the moisture/liquids enter the cavity of the RL assembly (300) it must still counteract the gravitational force which pulls it down into the waste bag (700) between every cycle. However, in the case where the moisture/liquids are drawn through the RL assembly (300) and possibly into the SD (410), a gas-liquid separation device can be implemented to ensure no moisture/liquids being sucked into the SD (410).

The RL assembly (300) is attached with a shaft supported at the inside/piercing through the sidewalls of the UPCA (110). This shaft is, according to the present example, part of the hinging brackets (311) transmitting the angular motion from the RL assembly (300) to the supports/bearings. Another possibility, presumably known by a skilled person, is use of bearings in the brackets/hinges and rigid mounting in the sidewall(s) of the UPCA (110), such that the RL assembly (300) rotates about a detachable shaft. In order for this mounting to work, there must be at least one such bracket. According to the present example, there are two such hinging brackets with shaft (311). These hinging brackets (311) are, according to the present example, integrated parts of the RL (310). However, these hinging brackets (311) may just as well be separate parts, this is also the case for the shaft which e.g. can be essentially a separate lengthy shaft, or a stud protruding from the hinging brackets (311).

According to the present example, at least one FGF (330), e.g. silicone, rubber or the like, continuous part or connected/adjoining strip/cord/list, is incorporated/embedded in a groove encircling the perforated plate (320) on the underside of the RL assembly (300). It is, however, also possible to attach the FGF (330) directly to the periphery of the perforated plate (320) without incorporating/embedding it in a groove. Independent on the different fastening methods, the FGF (330) is intended to seal the waste bag (700) from above. However, the FGF (330) can be attached on the flat surface of the flange at the top of the WBSM (210) instead. The FGF (330) is intended to ensure hermitization of the waste bag (700) even under poor circumstances, i.e. deficient/poor tolerances and/or objects ending up between the FGF (330) and the waste bag (700) causing troublesome sealing. The profile/cross-section of the FGF (330) may be rectangularly shaped, D-/O-/P-/E-/M-shaped, or any other favourable shape preferably improving the hermitization.

According to the present example, an FC (111) hindering access to the space within the UPCA (110) is pulled down in front of the accommodation hole when the RL assembly (300) moves towards the closed configuration and hermitizes the system. This feature is implemented for safety reasons and/or in order to hinder the accessibility of the mechanical and electrical components therein for both users and operators/cleaning staff. It is obvious for a skilled person that such a cover not necessarily needs to be pliable/flexible but can be hard and/or stiff as well. According to the present example, the FC (111) is configured in a way so as to permit easy folding/bending about "mechanical hinges" provoked by thin strips/areas with less or no material thickness in a plate, preferably with a pliable cloth/fabric/mesh/net on the back holding the part together, or possibly by actual hinges between narrow plates. The FC (111) can alternatively be some kind of a roller blind cloth or in other ways roll up and down depending on the RL assembly (300). It is obvious for a skilled person that other similar contingencies may be used serving the same purpose.

According to the present example, tracks/slots/railings appurtenant to the FC (111) can be utilised such that it follows/are guided along a predetermined path ensuring correct folding/roll-up and unfolding/roll-out as the RL assembly (300) approaches the open and closed position, respectively. The FC (111) may include protruding studs/ pins/plugs/etc. pointing outwards from its sides (i.e. not front or back) perpendicular to the thickness direction and serving as guiding pins following the tracks/slots/railings in order to enable improved flexibility of the FC (111) compared to wider, non-rotating plates being guided by the tracks/slots/railings. The outer part of the FC (111) is further attached to the FC mounting brackets (312) at the front of the RL assembly (300) in order to maintain a passive movement. It is evident that the FC (111) can be driven by its own driving unit or be attached to other positions of the RL assembly (300) as well. This FC (111) may, in addition to the above statements, be exploited for advertising/promotional purposes in form of posters or stickers, or digitally by letting the cover be a visual display unit/monitor/screen.

Suction Device Assembly (400):

According to the present example, further referenced to FIG. 5, FIG. 6, FIG. 9 and FIG. 10, the SD (410) is essential in order to enable evacuation of the waste bag (700) and thus compress the waste therein. The SD (410) is mounted on a vibration isolation bracket (VIB) assembly (420) intended to damp the vibrations possibly emerging from the SD (410). This VIB assembly (420) is further securely attached to the RL (310). The VIB assembly (420) is arranged such that the SD (410) is embodied/incorporated in some kind of a VIB basket/bed (422), keeping it in place due to friction (i.e. snap-lock/press fit). This basket/bed (422) is further connected to a VIB bracket (421) through three rubber balls (423) (frequently used in gimbals reducing vibrations from e.g. drones) holding the basket/bed (422) hovering just above the RL (310), meaning the vibrations are confined to move through these rubber balls (423) which eventually dampens most of them. It is obvious that other means of vibration dampening/isolation within the knowledge of a skilled person can be utilised instead, like e.g. rubber mats, fixtures made of soft/flexible/pliable plastics, etc. The underlying intention of mounting the SD (410) onto a VIB assembly (420) is to assure that the emerging vibrations is not transferred to the rest of the construction, i.e. the SWC (100), which ultimately implies reduced risk of wear, little or no unintentional disassembly and minimal noise.

A short (angled) not collapsible tube/hose (430) is, according to the present example, mounted between the inlet of the SD (410) and the tube/hose mounting nipple (314) at the outlet of the RL assembly (300). When the RL assembly (300) is in the closed configuration and the waste bag (700) is hermitized, the SD (410) starts evacuating the air inside the waste bag (700) through the RL assembly (300), the tube/hose mounting nipple (314) and the not collapsible tube/hose (430). It is obvious that a skilled person knows of other types of tubes and/or hoses that may be flexible or rigid performing equally. It is further expected that other versions of tube/hose mounting with or without nipples are within the knowledge of a skilled person.

According to the present example, the SD (410) is a vacuum pump, but it is obvious that other types of suction devices can be used for evacuation of the air within the waste bag (700) as well. Such alternatives can be e.g. other types of pumps, vacuum cleaners, fans, or similar within the knowledge of a skilled person. It is further possible to configure the SD (410) in other places than at the RL (310), like e.g. at the bottom of the LPCA (120) using a long not collapsible tube/hose (430) stretching up to the RL assembly (300). Another configuration can be an external box mounted on the outside of one of the sidewalls or at the front or backwall of the UPCA (110) or LPCA (120). The present invention may further enable connection/integration with external vacuum/suction systems in buildings and/or other facilities. All such configurations are expected to be within the knowledge of a skilled person.

According to the present example, a muffler is mounted on the outlet of the SD (410) via a bent guiding tube/hose in order to damp the pulsating sound waves emerging therein. The muffler is intended to provide a lower noise level of the SWC (100), i.e. to provide more silent compression, and thus supplying the users and operators/cleaning staff with an improved experience. Other obvious means of sound dampening measures known to a skilled person can be isolating/sound absorbing padding covering the inside of the UPCA (110) and/or LPCA (120), especially in the vicinity of the SD (410) or other sources of noise, porous absorbing foam/wadding in front of the outlet of the SD (410) without confining the air flow, or the like.

Despite small holes in the perforated plate (320) on the underside of the RL assembly (300), minor particles/debris may be sucked into the cavity of the RL assembly (300) and further into the SD (410). In order to avoid contamination of the housing of the SD (410) and possibly clogging of the system and thereby obstruction of the air flow, an air filter removing particles/debris from the air flowing through the system can be employed somewhere between the inlet of the SD (410) and the content of the waste bag (700). There are several types of filters that may be used, some of which are improvised filters, coarse or fine filters using e.g. wadding, paper, foam, cotton, fabric, or the like, semi HEPA, HEPA and ULPA. Positioning/placing of the air filter is arbitrary as long as it separates the content of the waste bag (700) from entering the inlet of the SD (410).

According to the present example, the SD (410) enable reduction of the waste volume comprised inside the waste bag (700) by evacuation of the air therein, thus inducing a pressure difference inside the hermitized system. During evacuation the waste bag (700) is drawn up against the perforated plate (320), ultimately contracting the waste bag (700) and the waste therein. Consequently, the waste is compressed by the external atmospheric pressure.

Figure 5:
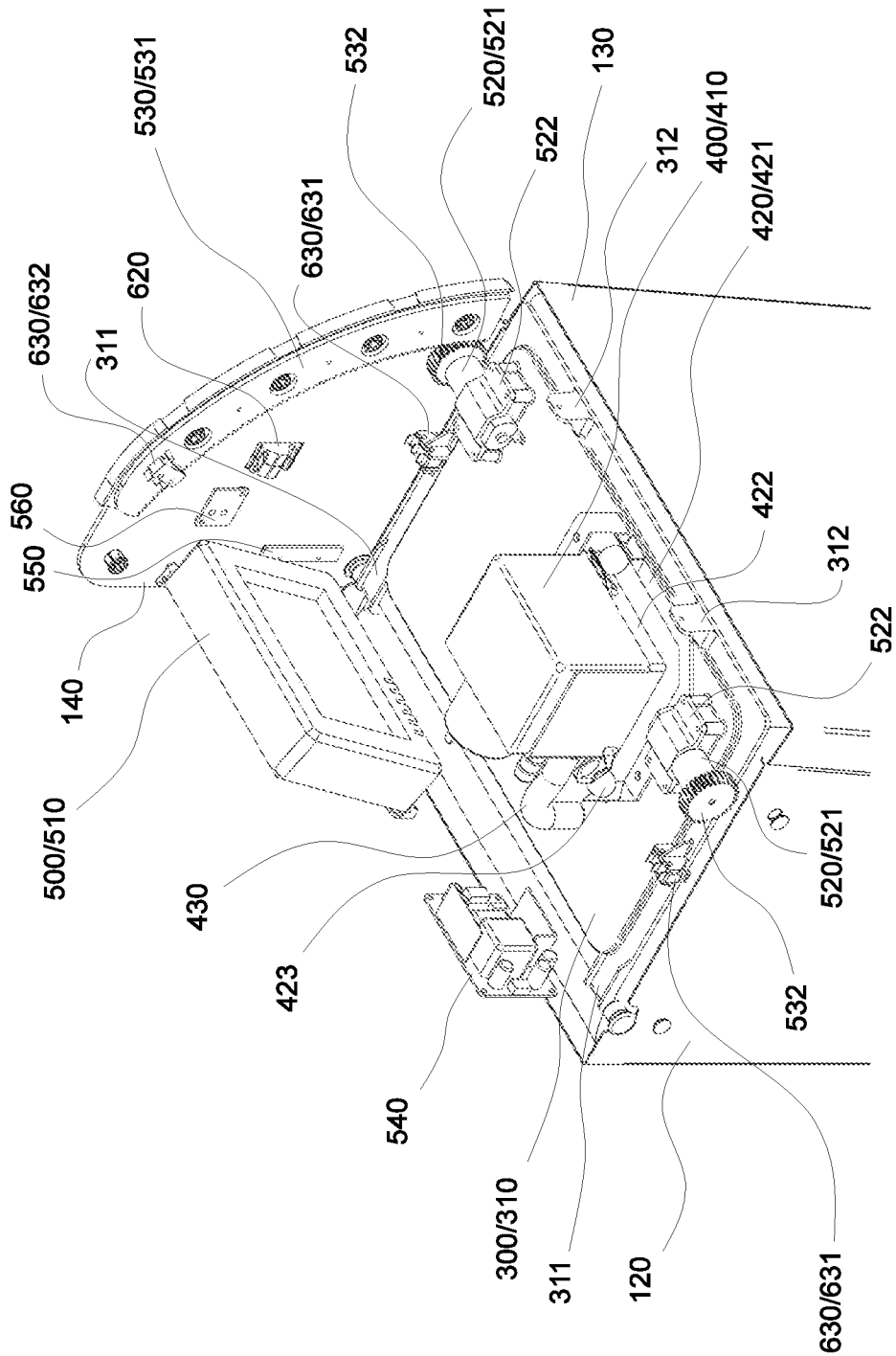
FIG. 5 is a principle drawing of a closer view of the internal components in the upper part of the container assembly (UPCA) (110) of a vacuum based SWC (100) according to an embodiment of the present solution with the RL assembly (300) in the closed configuration.
Figure 11:
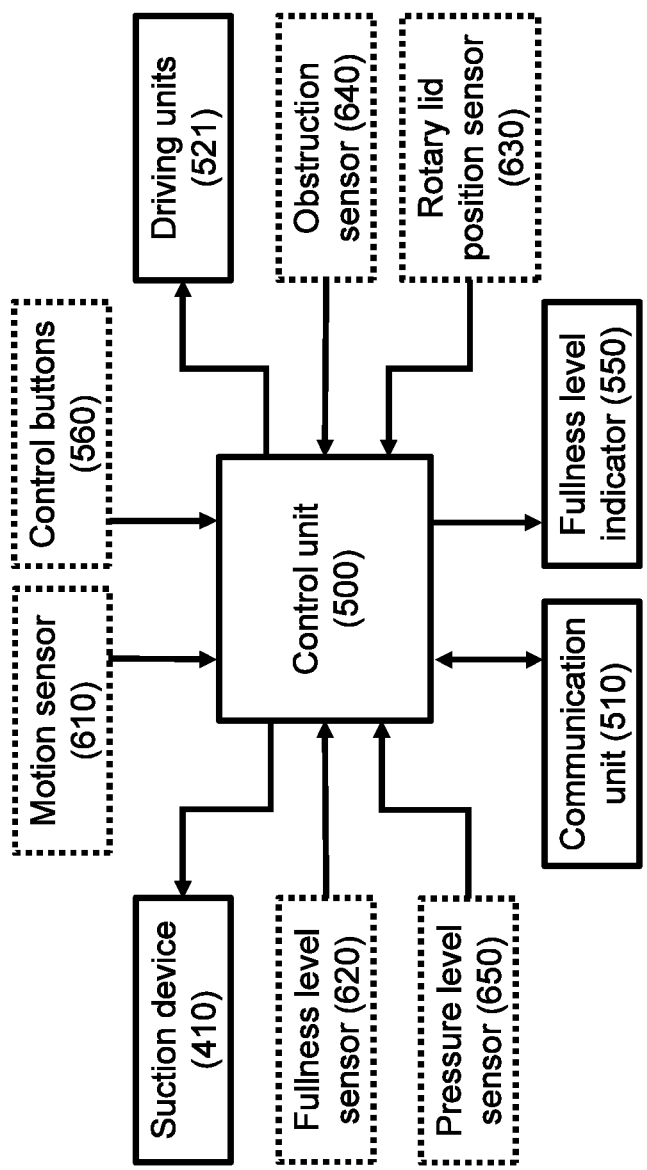
FIG. 11 is a control diagram showing signal/data flow of the vacuum based SWC (100) according to an embodiment of the present solution.

Control Unit (500), Communication and Power Supply:

Reference is now particularly made to FIG. 5 and FIG. 11. According to the present example, the control unit (500) govern all functions of the SWC (100), including opening and closing of the RL assembly (300) by use of the driving units (521), start and stop of the SD (410), abortion of compression cycle, notification with respect to fullness level and/or potential errors/faults, update and upload of raw data to database, all of which intended to be automatic. However, it should be possible to manually operate the SWC (100) via e.g. the control buttons (560). Activation of the SD (410) enable evacuation of the air inside the waste bag (700) and further creates a difference in pressure (i.e. partly vacuum) between the inside and outside of the waste bag (700), resulting in compression of the waste therein. Depending on sensor data sent to the control unit (500), or by manual deactivation, the SD (410) stops evacuating air from the waste bag (700). The control unit (500) is provided by means and/or software for controlling the different electrical devices of the SWC (100) by use of e.g. the acquired data from the sensor system (610, 620, 630, 640, 650).

The SWC (100) is also equipped with a communication unit (510) permitting one-way or two-way communication to/from the operators/cleaning staff, in addition to the ability of uploading raw data to a database. This communication may occur through e.g. a management system, an app for smart phones and/or tablets, a web page, or the like. The control unit (500) governs the communication unit (510) as well as the other electrical components, determining the frequency of communication and what to communicate, e.g. sensor readings, at different points in time. According to the present example, the communication unit (510), i.e. transmitter/receiver, is intended for communication to/from the SWC (100) via e.g. wired local area networks (LAN), wireless networks like Bluetooth or WLAN (i.e. Wi-Fi), or cellular networks like 2G, 4G, 5G, LoRa, NB-IoT, LTE-M, GPRS, or similar, optically via infrared light or laser, or the like. This enables information to flow rapidly and seamlessly between the SWC (100) and the operators/cleaning staff through e.g. a management system. Furthermore, connection to internet permits the acquired data collected by the sensors to be uploaded to a database for further processing and interpretation, possibly being the basis for effectivization of the logistics and workflow associated with waste handling The SWC (100) will, according to the present example, be provided with a power supply source in at least one of the following forms for powering the components in the electrical circuits/systems used in the SWC (100) via the power supply unit (PSU) (540); energy harvesting unit(s) (e.g. solar cells), chargeable unit(s) (e.g. batteries) and/or a power grid connection. In order to automatically control the functions and processes of the SWC (100) based upon acquired sensor data, information provided through the network connection or predetermined through code, a microcontroller (MCU), i.e. part of the control unit (500), is employed. It is, however, obvious for a skilled person that other controlling units providing timing and control of signals and the response of the input and output devices based on given instructions may be utilised to govern the processes included in the SWC (100).

Driving Unit Assemblies (520) and Gear Assemblies (530):

Reference is now particularly made to FIG. 5 and FIG. 11. According to the present example, the control unit (500) signals the driving units (521) to run forwards or backwards in order to control the movement of the RL assembly (300). In addition, a drivetrain, i.e. the gear assemblies (530), is needed to transmit the motion of the driving units (521) to the RL assembly (300). In order to ensure proper transmission of motion, motor brackets (522) are employed such that the driving units (521) are fixed to the RL (310).

According to the present example, one or more stationary inverted toothed gear racks (ITGR) (531) are attached to the inside of the sidewalls of the UPCA (110) in a given distance from the corresponding rotating cogwheels (532), ensuring correct meshing with the stationary ITGR (531). The rotating cogwheels (532) are mounted directly onto the driving units (521) shafts or via one or more other geared shafts, ultimately driving the RL assembly (300) up and down between the open and closed configuration. The rotating cogwheels (532) may be spring-loaded in order to compensate for possible misalignments or to adjust deficient/poor tolerances. They can be mounted directly onto the shaft of the driving units (521), or on a shaft coupled to the driving units (521) by one or more gears and/or shafts.

The tooth profile/form of the stationary ITGR (531) must be analogous to that of the rotating cogwheels (532). Preferably, the drivetrain, i.e. the gear assemblies (530), is configured such that the tooth profile/form provides an interlocking effect, meaning the RL assembly (300) is held up in the open position (or any other position) without the need of assistance from the driving units (521). The tooth profile may be either straight or angled, however, it is also possible to use a wheel and rack without any toothed profile, relying on frictional force, only. The intention of the drivetrain system is to provide an accurate and robust movement of the RL assembly (300) towards the WBSM assembly (200) ensuring proper hermitization of the waste bag (700) and back up to the open configuration, every time. It is obvious for a skilled person that other types of drivetrains like belt and/or chain drive, actuator(s) using a telescopic rod, push/pull rod mechanisms, or the like can be employed as substitutes of the gear assemblies (530) set in motion by the driving units (521).

Sensor System (610, 620, 630, 640, 650):

Reference is now particularly made to FIG. 1 through FIG. 6 and FIG. 11. In order to ensure no evacuation of the waste bag (700) and thereby a compression cycle running while personnel, animals or other moving objects are present, the invention is, according to the present example, equipped with at least one motion sensor (MS) (610), e.g. proximity, PIR, radar, etc., which can be utilised in order to detect presence of personnel, animals, robotics and/or the like. If a detection is made, a compression cycle will not be initiated before there have been no secondary detections for at least a predetermined period of time. Furthermore, a potential ongoing compression cycle will be aborted immediately, and the RL assembly (300) will instantly approach the open configuration. These actions are implemented in order to avoid potentially dangerous situations. It is obvious that a skilled person is able to consider other monitoring methods and sensors serving the same purpose, like connecting the SWC (100) to already existing motion sensor(s) and control unit(s) governing e.g. the light switch and/or power switch for the relevant room, dispatch an abortion signal every time the main door is opened/closed, or the like.

The SWC (100) is equipped with one or more fullness level sensor (FLS) (620) for measuring of the fullness level or in other ways calculate the waste level inside the waste bag (700). This enables on-demand compression of the waste therein, and notification of fullness level of the container towards the operators/cleaning staff. According to this particular example, an optical distance sensor is monitoring the distance from its location to the uppermost location of the content inside the waste bag (700). This information can e.g. be exploited when the waste bag (700) is close to full and there is a need for replacement/emptying, used for statistical purposes, or similar. Data acquired by the FLS (620) may be communicated real time or occasionally towards the operators/cleaning staff responsible of emptying/replacing the waste bag (700) via the communication unit (510). Hence, the operators/cleaning staff is notified that the content in the waste bag (700) no longer can be compressed sufficiently for further reception, meaning that the waste bag (700) must be replaced or emptied before long. On this basis, a management system can be exploited to optimise workflow, handling logistics, and reallocate and prioritise labouring hours. One alternative method for notifying the users and operators/cleaning staff is use of a fullness level indicator (550). Other monitoring methods and sensors serving the same purpose, like e.g. ultrasonic sensors, proximity sensors, use of the time from activation of the SD (410) until a predetermined pressure difference is obtained between the inside and outside of the waste bag (700), or similar can obviously be considered by a skilled person as it is expected that suchlike methods are within this person's knowledge.

One or more position sensor (PS) (630) are, according to the present example, used to provide information to the control unit (500) in order to ensure that the RL assembly (300) does not move too far or too short into open and closed configuration by that they indicate whether the RL assembly (300) has reached the open or closed position. This ultimately means that the driving units (521) are run until the PS (630) report that contact is made. In this particular example, bipartite end-stop sensors (630) consisting of lower (631) and upper (632) parts are employed. However, other possible solutions for monitoring of the position of the RL assembly (300) can be e.g. hall effect sensors, accelerometer(s), encoding of a predetermined (rotational) motion of the driving units (521), physical obstructions hindering further motion of the RL assembly (300) and consequently stop running the driving units (521) after a given period of time of confined motion, optically breaking of laser/light rays, exploitation of the container assembly (110, 120) itself as a "switch" detecting when the RL assembly (300) engage contact with the WBSM assembly (200) and thus the rest of the frame, or similar within the knowledge of a skilled person.

In order to reduce the risk of clamping hazards during movement of the RL assembly (300), one or more obstruction sensors (OS) (640) in the form of current sensors will, according to the present example, monitor the current consumption of the driving units (521) lifting and lowering the RL assembly (300). However, it is deemed very unlikely that anyone should be exposed for clamping hazards since evacuation of the waste bag (700) is not to be commenced when personnel, animals or other moving objects are present, due to the MS (610). Furthermore, if there is an obstruction hindering the regular movement of the RL assembly (300), the driving units (521) will consume more current than during normal motion, i.e. a predetermined value, and the movement is stopped/reversed/retried. In this context, an obstruction can be e.g. a hand intruded into the receptive hole in the UPCA (110), some of the content not properly inside the waste bag (700) (i.e. overflowing or hanging over the edge of the container), tools, instruments or similar. It is obvious that a skilled person is able to consider other monitoring methods and sensors serving the same purpose, like e.g. load sensors (moment/force), force-sensing resistor (FSR) strips/cords/lists, or the like.

In order to monitor the pressure level within the hermitized system, a pressure level sensor (PLS) (650) in the form of a current sensor continuously monitoring the current consumption of the SD (410) is, according to the present example, employed. Such a sensor can reveal differences in current consumption prior to, during and after a desired pressure difference (i.e. partly vacuum) is achieved between the inside and outside of the waste bag (700). Through use of a predetermined value for the current consumption, i.e. based on the desired vacuum/pressure level before abortion, the invention will enable the SD (410) to run until this value is exceeded and the desired pressure difference is attained, for a limited period of time or until manual deactivation. As the predetermined value of the vacuum/pressure level is exceeded, the SD (410) will stop running, and one compression cycle is hence conducted. When the pressure difference on the inside and outside of the waste bag (700) is equalised, the RL assembly (300) is driven back up to the open configuration. It is obvious that a skilled person is able to consider other monitoring methods and sensors serving the same purpose, like e.g. readings from a pressure sensor or a pressure gauge (manual or digital), the change in noise level when the pressure difference reaches a given value, or the like.

Method:

Accordingly, the present invention provides an SWC (100) comprised of a separable enclosure/container (110, 120), a WBSM assembly (200) arranged for suspension of a waste bag (700) therein and pivoting between "stand-by" and "easy-access" positions, a RL assembly (300) arranged for hermitization and de-hermitization of the waste bag (700) by moving between an open and closed configuration, and an SD assembly (400) arranged for evacuating the internal air of the waste bag (700), wherein a vacuum is preferably created inside. The SWC (100) further provides compression of the waste in the suspended and hermitized waste bag (700) according to the present invention by that the SD (410) evacuates the internal air of the waste bag (700) creating a vacuum therein, ultimately compressing the waste as a result of the difference in pressure between the inside and the outside of the waste bag (700). Subsequent to compression of the waste, the waste bag (700) is de-hermitized by admitting the ambient pressure into the sealed system, letting the compressed waste drop to the bottom of the waste bag (700) and the RL assembly (300) to travel back to its open configuration enabling reception of new waste.

According to the present invention, the SWC (100) can be arranged for manual, semi-automatic and/or automatic compression of waste inside a waste bag (700). This is possible by providing one or more FLS (620) or arranging the SWC (100) for calculating the waste level by use of time intervals between activation of the SD (410) and exceeding a predetermined pressure difference between the inside and outside of the waste bag (700). The control unit (500) can further be provided with such information which may activate compression of the waste automatically when the waste level in the waste bag (700) exceeds the predetermined level or at pre-set time intervals.

In an alternative embodiment of the SWC (100) operators/cleaning staff are noticed when the waste level in the waste bag (700) exceeds a predetermined level or where operators/cleaning staff manually inspects the waste bag (700), whereupon the operators/cleaning staff manually activates the compression process by e.g. pushing a button (560), or the like. In order to minimise volume of the replaced waste bag (700), the operators/cleaning staff may initiate a compression cycle just before the waste bag (700) is to be replaced. Hence, the operators/cleaning staff may benefit the retraction of the waste bag (700) and the succeeding compression of the content by replacing the waste bag (700) while in compressed state.

Other Means of Closing and Opening of Waste Accommodation Hole:

According to the present invention, other mechanisms opening and closing the reception hole of the UPCA (110) can be e.g. bipartite rotary hatches/lids, hatches/lids possibly moving along tracks/rails/slots, iris mechanism, telescopic mechanism where the hatch/lid is foldable by hinges towards one or more sides, etc.

Other Means Enabling Motion of the Rotary Lid Assembly (300):

According to the present invention, there are several other systems enabling movement of the RL assembly (300) between the predetermined extremal configurations like e.g. an actuator and a telescopic rod pushing and pulling the RL assembly (300), a push/pull rod system pushing and pulling the RL assembly (300), one or more small motors winding up and unwinding one or more wires via pulleys according to the desired operation of the SWC (100), a spring-loaded RL assembly (300), etc.

Larger Cross-Section of the Rotary Lid Assembly (300):

The bottom section of the RL assembly (300) may, according to the present invention, be arranged with a larger cross-sectional area in the central part, i.e. within the encirclement of the FGF (330). A larger cross-section in this context is intended to slightly push down the uppermost content of the SWC (100) mechanically due to the revolving motion of the RL assembly (300) before hermitization and consecutive compression. The change in cross-sectional area may be constant within the encircling FGF (330) or have a constant increase resulting in a pointy underside of the RL assembly (300). However, the preferred shape should be something in between the two extremes, allowing waste protruding up of the waste bag (700) and/or out of the accommodation hole to comply with the mechanically inflicted pressure without getting stuck or pinched.

Other Means of the Waste Bag Suspension Member (210):

In a modification of the present invention, the WBSM (210) can be mounted on the hinged door (130)/removable cover to ease access when replacing/emptying the waste bag (700) or during cleaning or other operations requiring easy access.

Raising and Lowering Mechanism:

According to the present invention, the SWC (100) may be equipped with a raising/lowering mechanism contributing to lift the waste bag (700) vertically in accordance with the evacuation of the internal air, i.e. with a translative rate implying equal or greater compression in the vertical direction compared to the transvers directions. Since both the container assembly (110, 120) and waste bag (700) shapes may constitute somewhat rectangular boxes that are longer in the vertical direction than in the transverse directions, a pressure difference between the inside and outside of the hermitized waste bag (700) emerging during a compression cycle entails equivalent pressure distribution with regards to the surface area of the sidewalls of the waste bag (700). Hence, omitting the raising/lowering mechanism may cause the waste bag (700) to be more compressed in the transverse directions than in the vertical direction. In addition, the gravity will affect the system, counteracting vertical compression even more. The result of implementing such a raising/lowering mechanism has the possibility of doubling or even tripling of the compression rate of the waste inside the waste bag (700).

This mechanism may e.g. be composed of an inflatable bladder inflated with the air which is evacuated from the waste bag (700). This is possible by use of a not collapsible tube/hose guiding the air from the outlet of the SD (410) to the inlet of the inflatable bladder. As the air is evacuated from the waste bag (700), the inflatable bladder is inflated and contribute to the raising of the waste bag (700) during compression. Said inflatable bladder must include a valve/ventilator allowing excess pressure/overpressure air to discharge/release in order to prevent explosion hazards. Additionally, the inflatable bladder should collapse under its own weight (or at least under the weight of the waste) subsequent to compression of the waste. In order to meet this requirement, air must be allowed to vent from the inflatable bladder through e.g. a valve/ventilator, intendedly poor sealing, or the like. Furthermore, a thin plate attached at the top of the inflatable bladder is advantageous as it ensures an evenly distributed lift of the waste bag (700), and exceedingly simplifies the cleaning of the LPCA (120). Said thin plate can act as a capping lid over the inflatable bladder when it is not in operation. The inflatable bladder is highly dependent on the SD (410) and the system implemented in the UPCA (110).

An alternative lifting/lowering mechanism can be a piston based on a telescopic, bellows/concertina fold, screw, scissor mechanism, or the like. Such a lifting/lowering mechanism can be 100% independent of the system encompassed in the UPCA (110). In any case, simple access and modular composition permitting quick replacement of components is advantageous. This may be accomplished by use of e.g. a drawer concept installed at the bottom of the LPCA (120), beneath the waste bag (700).

Gas-Liquid Separation Device:

According to the present invention, a modification can involve a gas-liquid separation device with the purpose of preventing moisture/liquids from being drawn into the SD (410). Therefore, because the SD (410) is not necessarily water-resistant (i.e. should not get water or other liquids into the system), and since the content of the waste bag (700) can be wet/moist, a gas-liquid separation device is intended to capture moisture/liquids that possibly can be drawn into the SD (410) through the cavity of the RL assembly (300).

This gas-liquid separation device is further arranged so as to capture the moisture/liquids in e.g. a lowered/countersunk part of the guided path of the airflow and thereby hinder it from reaching the SD (410). The placement of the gas-liquid separation device is in principle arbitrary as long as it is mounted between the inlet of the SD (410) and the content of the waste bag (700). However, the preferred position is between the outlet (314) of the RL assembly (300) and the inlet of the SD (410) due to simplicity. Several types of waste and/or other content may be moisture absorptive, meaning that a gas-liquid separation device not necessarily is required in practice. However, a gas-liquid separation device could be implemented in order to ensure that no moisture/liquids enters the SD (410).

Valve for Admission of Ambient Pressure:

In a modification of the present invention, the SWC (100) can be equipped with a valve for admission of ambient pressure in case the hermitization is very good, making it difficult to reopen the RL assembly (300) without equalisation of the pressure, such that it once again may receive waste/content. By use of such a valve, or similar, the invention may let the ambient pressure inside the waste bag (700), equalise the pressure, thus making the reopening of the RL assembly (300) easier.

Extra Pump:

According to the present invention, a modification can entail use of an extra pump pumping air back into the waste bag (700) subsequent to a compression cycle conducted involving possible reopening challenges of the RL assembly (300) due to proper hermitization. Furthermore, a powerful blast (more powerful than the achieved inflation occurring due to equalisation of the pressure) of air into the waste bag (700), potentially provided by one such pump, can contribute to arrange the content in a better/more efficient manner subsequent to compression, i.e. falling to the bottom of the waste bag (700) providing better spatial utilisation. An extra pump will, according to the present example, facilitate the possibility of additional evacuation of the air inside the hermitized system thereby reducing the runtime of a compression cycle.

Fan for Rapid Emptying of Waste Bag (700):

In a modification of the present invention, the SWC (100) can be equipped with a fan for rapid evacuation of the air inside the waste bag (700). The volumetric flow capacity of the SD (410) may be restricted by factors like e.g. cross-sectional area of the flow media, and the intended use the SD (410) is rated for. Therefore, a fan can be employed in order to increase the volumetric flow of air evacuated from the waste bag (700) and emptying most of the volumetrically occupying air therefrom before a valve, or the like, allows the system to switch device, using the SD (410) rated for and able to procure a desired pressure difference rather than high volumetric flow so as to compress the content therein.

Fluid Injector:

According to the present invention, a modification can entail the SWC (100) being equipped with a fluid injector, spraying water, antibacterial agent, or similar into the waste bag (700). It may be appropriate to add moisture to the content of the waste bag (700) if the content is moisture absorptive and the invention is used to e.g. compress its content. Likewise, it may be appropriate to add fluid deodorant, antibacterial or other disinfectants/bactericidal agents into the waste bag (700). In order to enable supplementation of suchlike substances, one or more fixtures/perforated areas on the underside of the perforated plate (320) or inside the cavity of the RL assembly (300) connected to a "squirting-mechanism" and further coupled to a tank/container with viscous content can be implemented. This viscous content can be squirted into the hermitized waste bag (700), and thereby moisturise the content of the waste bag (700) permitting more compact packing during, and subsequent to, compression. If the viscous content is some kind of deodorant, disinfectants and/or bactericidal agents, potential odour may be removed, sterilise the internal environment of, and/or prevent bacterial growth inside the waste bag (700).

Protection of Flexible Gasket Frame (330):

In a modification of the present invention, the SWC (100) can be equipped with a protection/shield/cover in order to keep the FGF (330) from being exposed to users and operators/cleaning staff. Since the FGF (330) may drastically improve the results obtained by use of the invention, it could be protected/shielded from exposure towards users and operators/cleaning staff. It could also be protected/shielded from the content inside the waste bag (700) and future receptive waste, "itchy-fingered" persons, other mess, equipment, tools, instruments, or similar which may limit or damage the function of the invention. This protection can be e.g. a cover/shield which may, or may not, guide the receptive waste into the waste bag (700). This cover/shield must, however, be withdrawn as the RL assembly (300) approaches the closed configuration. It can e.g. be spring-loaded and pushed away when the RL assembly (300) moves down.

UV-Lamp for Disinfection and Deodorisation:

In a modification of the present invention, the SWC (100) can be equipped with an UV light source employed for the purpose of disinfecting and deodorising the internal environment of the waste bag (700). The UV light source may e.g. be mounted on the underside of the RL assembly (300).

Odour and/or Disinfection Filter:

According to the present invention, a modification can entail the SWC (100) being equipped with one or more odour/disinfection filters. If the content in the container is not emptied as frequently as earlier, it is possible that bacterial growth and/or waste gasses and odour emerge. There are plenty of opportunities for prevention of emerging odour. A common solution is charcoal filters, however other filters may function just as well. During a compression cycle, the SD (410) evacuates air from the waste bag (700). This air is further forced/driven into the surrounding environment and thereby exposed for the personnel therein. In order to avoid potential odour and/or hazardous waste gasses to reach said personnel, one such filter may be mounted somewhere between the surrounding environment and the content of the waste bag (700), preferably no later than the outlet of the SD (410).

Suspension Rack for Waste Bag (700) Roll:

In a modification of the present invention, the SWC (100) can be equipped with a suspension rack for a roll of waste bags (700). Such a device can simplify the emptying/replacement process with respect to the waste bag (700). This suspension rack may be mounted at the bottom of the LPCA (120) and can be comprised of e.g. a shaft attached to/supported by the side walls of the LPCA (120), or at the corresponding bottom plate. If a raising/lowering mechanism is to be used, the suspension rack must not conflict the movements of this mechanism.

Sensor for Organic Earthing of the Electrical System:

In a modification of the present invention, the SWC (100) can be equipped with a sensor system detecting organic earthing of the electrical system. By letting the SWC (100) carry a very low current through all electrically conductive components at all times, it is possible to measure the electrical resistance of the system during organic contact, i.e. without harming the object/subject exposed, with e.g. the RL assembly (300), or any other electrically conductive part of the SWC (100). If organic contact is registered, the sensor sends a signal to the control unit (500) resulting in abortion of the potentially ongoing compression cycle or in that the RL assembly (300) maintains in the open "stand-by" configuration.

Other Means of Fullness Level Sensor (620):

In a modification of the present invention, the SWC (100) can be equipped with e.g. a weighing scale/balance as an alternative to the FLS (620), either mounted at the bottom of the LPCA (120), arranged at the top surface of the WBSM (210) or a combination of the two, depending on the suspension of the waste bag (700). An alternative solution can be e.g. utilisation of FSR. Based on this acquired information it is possible to estimate the fullness level of the waste bag (700).

Other Means of Obstruction Sensor (640):

According to the present invention, a modification of the OS (640) can entail the SWC (100) being equipped with e.g. at least one load sensor based on force, moment or similar intended to measure the resistance during motion of the RL assembly (300) and notify the control unit (500) that this motion should be aborted/reversed/retried if an obstruction causes a higher load than the pre-set "normal" value. Another possibility is use of FSR along e.g. the underside of the RL assembly (300) in order to monitor the load/force level. A third alternative may be utilisation of an accelerometer in order to monitor irregular movement originating from e.g. obstructions.

Other Means of Pressure Level Sensor (650):

According to the present invention, a modification of the PLS (650) can entail the SWC (100) being equipped with one or more pressure sensors and/or analogue/digital gauges in order to monitor the difference in pressure between the hermitized system and the surrounding environment. Based on the acquired data, the control unit (500) determines whether the SD (410) should continue running or shut down.

According to the present invention, there are several alternative areas of application for the SWC (100) besides the above, thoroughly described segment considering paper towels in public restrooms. Three examples of which are described in greater detail below:

Waste—There are endless types of waste which may be suitable for one or more possible embodiments of the SWC (100). Some of which are paper waste including but not limited to; paper towels, shredded refuse, copier paper, general office waste, cardboard, paperboard, packaging, etc., sanitary waste including but not limited to; diapers, sanitary bands, disposable instruments/tools other waste originating solely from humans and/or human activities, etc., biological waste including but not limited to; garden refuse (leaves, weeds, twigs, mowed grass, etc.), human or animal parts (nails, skin, blood, bone, tissue, etc.), food waste, plants, compost, etc., plastic waste including but not limited to; packaging waste, bags, bottles, toys, parts/items, etc., Municipal solid waste (MSW)/general waste often consisting of but not limited to some combination of the precedingly described types of waste.

Storage—One or more possible embodiments of the SWC (100) may allow several objects or an amount/quantity of some items to be stored, preferably improving the spatial absorption of its/theirs whereabouts by taking up less space. Some examples of suchlike objects/items are given in the following; clothes, duvets and pillows, cushions, blankets, curtains, sleeping bags, towels, other voluminous (possibly compressible) items, general storage of objects/items, etc. Note that the envisioned embodiments of the SWC (100) include but are not limited to the preceding examples.

Food—There are various uses of one or more embodiments of the SWC (100) which may be adopted in order to treat, handle and/or process foods in one way or another. Such uses include but are not limited to the following examples; preservation, preparation, ripening, heat treatment, curing, smoking, storing, freight, etc.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The control unit (500) as mentioned herein may be implemented by means of hardware comprising several distinct elements, and by means of a suitably programmed computer.

The invention claimed is:

1. A device for compressing waste, said device including:
   a waste bag suspension member formed with an upper portion around which an opening of a flexible waste bag may be spanned;
   a lid movable between an open position, wherein waste may be added to a suspended waste bag through the upper portion of the waste bag suspension member, and
   a closed position, wherein the lid covers the upper portion of the waste bag suspension member so that an at least partially closed volume may be formed between the lid and the waste bag; and
   a suction device adapted to evacuate air from the at least partially closed volume,
   wherein the lid comprises:
      a first perforated surface comprising a plurality of perforations so that the suction device may evacuate the air through the plurality of perforations in the lid; and
      a second surface to which the suction device is mechanically mounted,
         wherein the second surface is located above the first surface in the closed position, and
         wherein the second surface does not comprise the plurality of perforations.

2. The device according claim 1, wherein the lid is rotatable between the open and the closed position.

3. The device according to claim 1, wherein the suction device is mechanically connected to the lid.

4. The device according to claim 3, wherein the suction device is connected to the lid via vibration damping means.

5. The device according to claim 1, wherein the device is provided with a means for reducing noise from the suction device.

6. The device according to claim 1, wherein the device further comprises an air filter provided upstream of an inlet and/or of an outlet of the suction device for preventing fine particles and/or odor and/or bacteria and/or noxious gasses from reaching the suction device and/or to be pumped out of the suction device.

7. The device according to claim 1, wherein the waste bag suspension member further comprises a lower portion adapted to at least partially cover the sides of the suspended waste bag when it is suspended in the waste bag suspension member.

8. The device of claim 1, further comprising a flexible gasket frame for sealing between the lid and the waste bag suspension member.

9. The device of claim 1, wherein the lid comprises:
   a hollow structure comprising the perforated first surface and the second surface,
      wherein air evacuated through the plurality of perforations by the suction device flows through the hollow structure from the plurality of perforations to an outlet in the second surface.

10. A system for compressing waste, the system including:
    a device, wherein the device comprises:
       a waste bag suspension member formed with an upper portion around which an opening of a flexible waste bag may be spanned;
       a lid movable between an open position,
          wherein waste may be added to a suspended waste bag through the upper portion of the waste bag suspension member, and a closed position,
          wherein the lid covers the upper portion of the waste bag suspension member so that an at least partially closed volume may be formed between the lid and the suspended waste bag; and
       a suction device adapted to evacuate air from the at least partially closed volume,
          wherein the lid comprises:
             a first perforated surface comprising a plurality of perforations so that the suction device may evacuate the air through the plurality of perforations in the lid; and
             a second surface to which the suction device is mechanically mounted,
                wherein the second surface is located above the first surface in the closed position, and
                wherein the second surface does not comprise the plurality of perforations;
    the suspended waste bag spanned over the upper portion of the waste bag suspension member; and
    a housing at least partially covering the lid, the waste bag suspension member and the suspended waste bag,
       wherein the suspended waste bag, upon evacuation, is retracted to compress waste present therein.

11. The system according to claim 10, wherein the waste bag suspension member is coupled to the housing via a hinge, and is tiltable from a first position, wherein the upper portion is substantially horizontal, to a second position, wherein the upper portion is at least partially vertical.

12. The system according to claim 10, wherein the system is provided with a control unit adapted to regulate compression cycles of the system.

13. The system according to claim 12,
wherein the system may function as a sensor hub provided with one or more sensors and/or means for sensing/monitoring and/or acquire data/information about one or more of the following parameters;
personnel proximity to the system;
fullness of the suspended waste bag;
current consumption of the suction device;
current consumption of a motor for moving the lid;
position of the lid;
pressure in the at least partially closed volume between the suspended waste bag and closed lid, and
wherein the control unit is adapted to regulate the compression cycles at least partially based on one or more of the following parameters:
an indoor climate parameter indicative of one of the following: temperature, CO2 level, humidity, total volatile organic compounds (TVOC), pathogen level, ambient pressure, radon level; and
local temperature within and outside the device.

14. A method for compressing waste by means of a system, wherein the system comprises:
a device, wherein the device comprises:
a waste bag suspension member formed with an upper portion around which an opening of a flexible waste bag may be spanned;
a lid movable between an open position,
wherein waste may be added to a suspended waste bag through the upper portion of the waste bag suspension member, and a closed position,
wherein the lid covers the upper portion of the waste bag suspension member so that an at least partially closed volume may be formed between the lid and the suspended waste bag; and
a suction device adapted to evacuate air from the at least partially closed volume,
wherein the lid comprises:
a first perforated surface comprising a plurality of perforations so that the suction device may evacuate the air through the plurality of perforations in the lid; and
a second surface to which the suction device is mechanically mounted,
wherein the second surface is located above the first surface in the closed position, and
wherein the second surface does not comprise the plurality of perforations;
the suspended waste bag spanned over the upper portion of the waste bag suspension member; and
a housing at least partially covering the lid, the waste bag suspension member and the waste bag,
wherein the suspended waste bag, upon evacuation, is retracted to compress waste present therein;
the method comprising the steps of:
spanning the suspended waste bag around the upper portion of the waste bag suspension member;
closing the lid;
starting the suction device to evacuate the at least partially closed volume between the closed lid and the suspended waste bag in order compress waste present in the suspended waste bag by retraction of the suspended waste bag; and
removing the suspended waste bag with compressed waste.

15. The method according to claim 14, wherein the method, prior to removing the suspended waste bag comprises the following steps:
opening the lid to allow more waste to be added to the suspended waste bag after the waste has been compressed,
closing the lid again; and
restarting the suction device to evacuate the at least partially closed volume between the closed lid and the suspended waste bag to further compress the waste present in the same suspended waste bag by retraction of the suspended waste bag.

* * * * *